US008730084B2

(12) United States Patent
Al-Khalefah et al.

(10) Patent No.: US 8,730,084 B2
(45) Date of Patent: May 20, 2014

(54) DUAL MODE GROUND PENETRATING RADAR (GPR)

(75) Inventors: Tariq A. Al-Khalefah, Riyadh (SA); Khaled F. R. Almutairi, Riyadh (SA); Arne V. Utsi, Sarek (GB)

(73) Assignee: King Abdulaziz City For Science and Technology, Riyadh (SA)

( * ) Notice: Subject to any disclaimer, the term of this patent is extended or adjusted under 35 U.S.C. 154(b) by 485 days.

(21) Appl. No.: 12/955,231

(22) Filed: Nov. 29, 2010

(65) Prior Publication Data
US 2012/0133543 A1    May 31, 2012

(51) Int. Cl.
| G01S 13/00 | (2006.01) |
| H01Q 11/02 | (2006.01) |
| H01Q 9/00  | (2006.01) |
| H01Q 1/00  | (2006.01) |
| H01Q 7/08  | (2006.01) |
| H01Q 9/04  | (2006.01) |
| H01Q 9/16  | (2006.01) |

(52) U.S. Cl.
USPC ............ 342/22; 343/739; 343/749; 343/751; 343/752; 343/787; 343/788; 343/790; 343/802

(58) Field of Classification Search
USPC ............ 342/22; 343/723, 739, 749–752, 787, 343/788, 790–793, 802
See application file for complete search history.

(56) References Cited

U.S. PATENT DOCUMENTS

| 3,680,146 | A | * | 7/1972  | Leitner et al. ................. 343/792 |
| 3,879,735 | A | * | 4/1975  | Campbell et al. ............. 343/792 |
| 3,965,474 | A | * | 6/1976  | Guerrino et al. .............. 343/719 |
| 3,999,185 | A | * | 12/1976 | Polgar et al. .................. 343/709 |
| 4,005,423 | A | * | 1/1977  | Webb ............................ 342/194 |
| 4,101,899 | A | * | 7/1978  | Jones et al. ................... 343/788 |
| 4,218,687 | A | * | 8/1980  | Faigen et al. ................. 343/885 |
| 4,330,783 | A | * | 5/1982  | Toia ............................. 343/749 |
| 4,494,122 | A | * | 1/1985  | Garay et al. .................. 343/722 |
| 4,496,953 | A | * | 1/1985  | Spinks et al. ................. 343/792 |
| 4,504,834 | A | * | 3/1985  | Garay et al. .................. 343/749 |
| 4,562,438 | A | * | 12/1985 | Rouse et al. .................. 342/201 |
| 4,730,195 | A | * | 3/1988  | Phillips et al. ................ 343/792 |
| 4,746,926 | A | * | 5/1988  | Stern et al. ................... 343/787 |
| 4,755,827 | A | * | 7/1988  | Stern et al. ................... 343/785 |
| 4,968,991 | A | * | 11/1990 | Yamazaki ..................... 343/715 |
| 5,057,845 | A | * | 10/1991 | Gellekink ..................... 342/137 |

(Continued)

OTHER PUBLICATIONS

"Design of a GPR for deep investigations", Advanced Ground Penetrating Radar, 2007 4th International Workshop on Date of Conference: Jun. 27-29, 2007, Utsi, V. pp. 222-225.*

(Continued)

*Primary Examiner* — Peter Bythrow
(74) *Attorney, Agent, or Firm* — Andrew M. Calderon; Roberts Mlotkowski Safran & Cole, P.C.

(57) ABSTRACT

A dual mode ground penetrating radar includes an enclosure which houses radar electronics. The dual mode ground penetrating radar includes an enclosure housing radar electronics. The dual mode ground penetrating radar further includes a first antenna feed having ferrite loading and extending outside of the enclosure. The dual mode ground penetrating radar further includes a second antenna feed spaced apart from the first antenna feed, the second antenna feed having ferrite loading and extending outside of the enclosure. An RF signal is provided in at least one of the first and second antenna feeds by the radar electronics.

22 Claims, 10 Drawing Sheets

(56) References Cited

U.S. PATENT DOCUMENTS

| | | | |
|---|---|---|---|
| 5,173,706 A * | 12/1992 | Urkowitz | 342/99 |
| 5,325,095 A * | 6/1994 | Vadnais et al. | 342/22 |
| 5,357,253 A * | 10/1994 | Van Etten et al. | 342/22 |
| 5,440,317 A * | 8/1995 | Jalloul et al. | 343/791 |
| 5,568,150 A | 10/1996 | Taylor, Jr. et al. | |
| 5,726,657 A | 3/1998 | Pergande et al. | |
| 5,900,833 A * | 5/1999 | Sunlin et al. | 342/22 |
| 5,933,117 A * | 8/1999 | Gerhard | 343/709 |
| 5,977,928 A * | 11/1999 | Ying et al. | 343/790 |
| 6,154,167 A * | 11/2000 | Annan et al. | 342/22 |
| 6,232,913 B1 | 5/2001 | Lehtinen | |
| 6,246,355 B1 * | 6/2001 | Miceli et al. | 342/22 |
| 6,377,872 B1 * | 4/2002 | Struckman | 700/258 |
| 6,472,983 B1 * | 10/2002 | Grunder | 340/540 |
| 6,771,206 B2 * | 8/2004 | Berthelier et al. | 342/22 |
| 6,853,327 B2 * | 2/2005 | Miceli et al. | 342/22 |
| 6,956,535 B2 * | 10/2005 | Hart | 343/792 |
| 7,196,653 B2 | 3/2007 | Hall et al. | |
| 7,382,310 B1 | 6/2008 | Piesinger | |
| 7,400,974 B2 * | 7/2008 | Fuchs et al. | 701/484 |
| 7,675,289 B1 * | 3/2010 | Stolarczyk et al. | 324/334 |
| 7,711,322 B2 * | 5/2010 | Rhodes et al. | 455/40 |
| 7,733,077 B1 * | 6/2010 | Merewether et al. | 324/67 |
| 7,737,905 B1 * | 6/2010 | Meloling et al. | 343/788 |
| 8,055,193 B2 * | 11/2011 | Rhodes et al. | 455/40 |
| 8,207,885 B2 | 6/2012 | Hibbard et al. | |
| 2003/0030591 A1 * | 2/2003 | Gipson et al. | 343/792 |
| 2003/0090406 A1 * | 5/2003 | Longstaff et al. | 342/22 |
| 2003/0090428 A1 * | 5/2003 | Marie et al. | 343/787 |
| 2003/0132873 A1 * | 7/2003 | Berthelier et al. | 342/22 |
| 2006/0286931 A1 * | 12/2006 | Rhodes et al. | 455/40 |
| 2007/0010702 A1 * | 1/2007 | Wang et al. | 600/8 |
| 2007/0035304 A1 * | 2/2007 | Stolarczyk et al. | 324/330 |
| 2007/0132630 A1 * | 6/2007 | Beckner | 342/22 |
| 2008/0007473 A1 * | 1/2008 | Yosui et al. | 343/788 |
| 2008/0218170 A1 * | 9/2008 | Stolarczyk et al. | 324/330 |
| 2008/0246647 A1 * | 10/2008 | Hellsten | 342/22 |
| 2008/0288927 A1 * | 11/2008 | McGuire et al. | 717/135 |
| 2010/0109933 A1 * | 5/2010 | Rhodes et al. | 342/22 |
| 2010/0225525 A1 | 9/2010 | Takase et al. | |
| 2010/0302116 A1 * | 12/2010 | Patrick et al. | 343/749 |
| 2010/0315280 A1 * | 12/2010 | Bakhtar | 342/22 |
| 2011/0102244 A1 * | 5/2011 | Jales et al. | 342/135 |
| 2013/0169468 A1 | 7/2013 | Johnson et al. | |

OTHER PUBLICATIONS

"Ultra Long Range Radar Imaging of a Mine Waste Dump", Ground Penetrating Radar, 12th International Conference on, Date of Conference: Jun. 16-19, 2008.*

"Real-time Sampling of Ground Penetrating Radar and Related Processing", Lulea University of Technology, Dept. of Computer Science and electrical Engineering, Division of Signal Processing, Jan. 17, 2005. Retrieved Aug. 4, 2013 from http://epubl.ltu.se/1402-1617/2005/039/LTU-EX-05039-SE.pdf.*

"A summary of Measurements of Permittivities and Permeabilities of some Microwave Absorbing Materials", W.A. Spurgeon, M. EL Rayess, P. Dorsey, C. Vittoria, U.S. Army Materials Technology Laboratory, May 1990, Retrieved Aug. 4, 2013 from http://www.dtic.mil/cgi-bin/GetTRDoc?AD=ADA223221.*

UTSI, "Design of a GPR for deep investigations", IEEE, 2007, 4 pages.

Francke et al., "Ultra Long-Range Radar Imaging of a Mine Waste Dump", 12th Int'l Conf. on Ground Penetrating Radar, Jun. 16-19, 2008, 4 pages.

Office Action for related U.S. Appl. No. 13/762,473 dated Aug. 1, 2013.

* cited by examiner

DUAL MODE GROUND PENETRATING RADAR (GPR)

FIELD OF THE INVENTION

The invention relates to a ground penetrating radar and, more particularly, to a dual mode ground penetrating radar (GPR) for measuring the depths of subsurface geological structures (e.g., sand dunes, geological layers or water table depths). In embodiments, the dual mode operation interleaves a short transmit pulse with a sequence of longer spread spectrum pulses.

BACKGROUND OF THE INVENTION

Ground-penetrating radar (GPR) is a geophysical method that uses radar pulses to image a subsurface. This is a non-destructive method of imaging. The non-destructive method uses electromagnetic radiation in the radiowave band (HF/VHF/UHF frequencies) of the radio spectrum, and receives the reflected signals from subsurface structures. The amplitude and phase of the reflected signal depends on changes in the structure's physical properties. GPR can be used in different applications in a variety of media, including rock, soil, ice, fresh water, pavements and buildings. It can detect objects and changes in material, for example subsurface voids, cavities and utilities.

The depth range of GPR is limited by the electrical conductivity of the ground, the transmitted center frequency, the radiated power and receiver sensitivity. As conductivity increases, the penetration depth also decreases. This radiated energy is more quickly converted into heat. For each wavelength in the ground, a certain fraction of the energy is lost causing a loss in signal strength at depth. Typical depth performance of GPRs is about 20 wavelengths. Higher frequencies, with shorter wavelengths, do not penetrate as far as lower frequencies, but give better resolution. In conventional systems, good penetration is achieved in dry sandy soils or dense dry materials such as granite and limestone where the depth of penetration could be up to 50 m. In moist and/or clay-laden soils and soils with high electrical conductivity, penetration is sometimes only a few centimeters.

In conventional low frequency GPR, antennas require long wires with resistors at regular intervals. In these conventional antennas, the resistors are placed in series with the antenna segments in order to dampen the antenna and provide a resistive load. The electronics and batteries are placed in the middle of the antenna. Such an arrangement makes the antennas fragile and costly to manufacture.

It is also noted that the quality of land seismic data suffers from irregularities within the near surface, which is composed of layers that have experienced variable degrees of weathering. Examples of these irregularities include: lateral variation in thickness, lateral and vertical velocity variations, rugged topography, sand dune structures, and effects of near-surface water. The effects of these irregularities on seismic data include: static, scattering, multiples, ground roll, weak penetration of signal into deeper layers, and severe amplitude losses. These effects on seismic data are more severe in arid areas due to the extensive weathering that these areas have experienced during their geological history. Therefore, petroleum companies, for example, working with seismic data in Middle Eastern countries find that these data suffer greatly from adverse near-surface effects. This can be evidenced by the increasing number of forums devoted to issues of the near-surface during the last few years.

Accordingly, there exists a need in the art to overcome the deficiencies and limitations described hereinabove.

SUMMARY OF THE INVENTION

In a first aspect of the invention, a dual mode ground penetrating radar comprises an enclosure which houses radar electronics. The dual mode ground penetrating radar comprises a first antenna feed having ferrite loading and extending outside of the enclosure. The dual mode ground penetrating radar comprises a second antenna feed spaced apart from the first antenna feed, the second antenna feed having ferrite loading and extending outside of the enclosure. An RF signal is provided in at least one of the first or second antenna feeds by the radar electronics.

In an embodiment, the first antenna and the second antenna are center fed resistively loaded dipoles to achieve broadband, non-resonating radar performance. The radar electronics include a transmitter and a receiver, and the first antenna feed and the second antenna extending outside the enclosure are respectively connected to the transmitter and the receiver. The radar electronics provide a 5 to 20 MHz frequency band range. The real time analog to digital conversion samples all points on a single transmit pulse. The receiver includes a field-programmable gate array (FPGA) for signal processing and performs convolution and averaging for increased sensitivity. A datalogger is provided internally or externally of the enclosure for recording data.

In an embodiment, the first antenna and the second antenna are devoid of electronics and are fed by coaxial cables with ferrites provided at intervals along the first and second antenna feeds to obtain the desired broadband antenna frequency response. A coaxial inner wire is independently used to carry the RF signal to the center of the antenna. A global positioning system provides location information for accurate mapping. A battery is provided for powering the radar electronics. The electronics and power supply enclosure is carried in a vehicle or a portable back pack.

One half of the antenna radiating element is the outer screen with length determined by the ferrites. These ferrites are a number of inductive stacked ferrite toroids which provide a high impedance at a point defining an end of the antenna and, beyond the end, lossy ferrites at regular intervals up to the radar electronics. The other half of the radiating element is a single wire with ferrites providing the resistive loss. The ferrite material is selected to have a low $\mu'$ and high $\mu''$ at the frequency of operation. This makes the ferrite behave more like a pure resistor than an inductor.

In an embodiment, the frequency of interest $\mu''$ may be about at least 3 times larger than $\mu'$. This makes the ferrite look mainly resistive, not inductive. The actual value is less important as this can be compensated for by using more than one ferrite, e.g., two or three side by side to provide the wanted resistance.

In an embodiment, the ferrite is a 10 mm diameter toroid equivalent to a 22 ohm resistor from 5 to 15 MHz when threaded over a single wire. A transmit pulse is spread out in time and compressed in the receiver and the receiver is synchronized to the transmitter so the receiver can determine when long and short pulses are sent in order to correlate the internal processing. The short transmit pulse is interleaved in the transmit sequence.

In accordance with aspects of the invention, a dual mode GPR comprises an enclosure for housing electronics. The electronics comprise: a transmitter transmitting signals; and a receiver for receiving signals. The receiver includes a real time analog-to-digital converter and a field-programmable gate array (FPGA) for signal processing and averaging for increased sensitivity. The dual mode GPR comprises an antenna comprising a first antenna feed and a second antenna feed connected to the transmitter and the receiver, respectively. The first antenna feed and the second antenna feed are shielded with ferrite and the second antenna feed having a wire independently used to carry a RF signal to a center of the antenna. A battery provides power to the electronics.

In another aspect of the invention, a method of applying pulse compression to a signal is provided. The method comprises transmitting long interleaved transmit pulses, receiving the long interleaved pulses, compressing the interleaved long transmit pulses, extracting a first sequence and a second sequence from the interleaved compressed long transmit pulse, and producing a time response.

In another aspect of the invention, a computer program product comprising a computer usable storage medium having readable program code embodied in the storage medium is also provided. The computer program product includes at least one component operable to provide the features discussed herein.

BRIEF DESCRIPTION OF THE DRAWINGS

The present invention is described in the detailed description which follows, in reference to the noted plurality of drawings by way of non-limiting examples of exemplary embodiment of the present invention.

DETAILED DESCRIPTION OF THE INVENTION

The invention relates to a ground penetrating radar (GPR) and, more particularly to a dual mode GPR. The dual mode GPR allows for rapid measurement of geological structures or layer depths, such as sand dunes more than 100 m depth, and weathering patterns of geological features. The present invention provides knowledge of sand dunes and weathering layer depths for accurate interpretation of seismic data used, for example, by the oil exploration industry, mining industry, geotechnical investigations and groundwater exploration.

Further, the antenna of the dual mode GPR arrangement allows for measurement in harsh environmental conditions and, advantageously, can achieve its resistive loading without the user of resistors that force the antenna to be excited at its midpoint. Instead, the present invention uses ferrite rings with selective characteristics to provide the resistive loading.

In implementing the present invention, a very low frequency ground penetrating radar is used with a unique antenna configuration and mounting arrangement, and a dual mode transmitter control. A low frequency in combination with pulse compression technology provides improved depth capability over conventional antennas. Specifically, the GPR of the present invention uses the 5 to 20 MHz frequency band range, which is lower than commercially available GPR systems. This low frequency has a long wavelength which attenuates less in sand than higher frequencies. Further, the receiver of the antenna has higher sensitivity because it performs real time analog-to-digital conversion and a field-programmable gate array (FPGA) for signal processing. In addition, the GPR scans over the surface without disrupting the surface.

Figure 1:
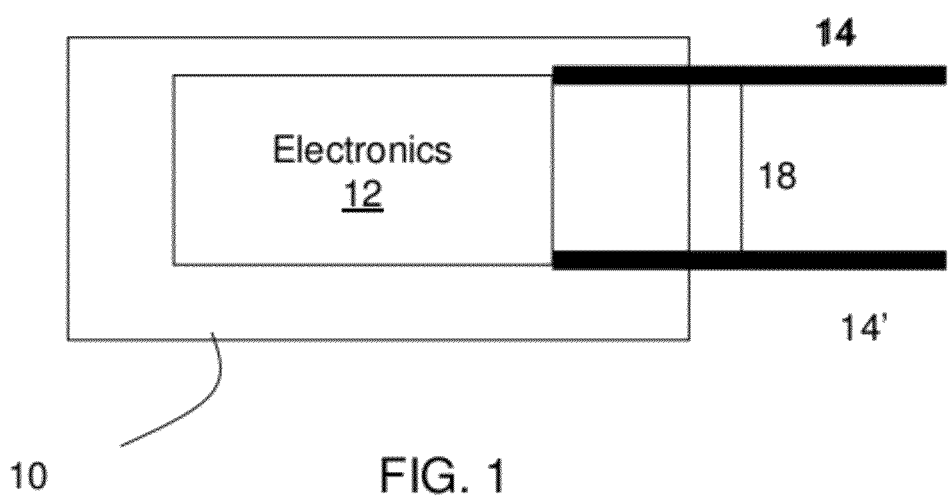
FIG. 1 shows a dual mode ground penetrating radar in accordance with aspects of the invention.

FIG. 1 shows a dual mode ground penetrating radar 10 in accordance with aspects of the invention. According to aspects of the present invention, an end fed resistively loaded dipole antenna is used to achieve broadband, non-resonating radar performance. Such characteristics are achieved by feeding an antenna of the present invention from one end with an external signal source but exciting the antenna in the middle. This differs from conventional systems which require that an antenna have a RF power source that is in the center of the antenna.

According to aspects of the invention, the dual mode ground penetrating radar 10 includes antennas composed of transmitter and receiving wires (i.e., arms or antenna feeds) 14, 14' which are positioned side-by-side. In an embodiment, the wires 14, 14' do not contain any electronics. Instead, the electronics 12, e.g., transmitter, receiver, and power supply, are housed inside an enclosure 10 that can, advantageously, be temperature controlled and can further maintain the electronics 10 in a clean environment. This results in a robust antenna that has a thin profile and can be easily deployed in many different environments and terrains, e.g., rugged and severe environments. The arms 14, 14' can be coaxial cables, for example, as described with reference to FIG. 5 or screened twisted pair cables.

In an embodiment, the signal source is external to the antenna, which differs from the conventional antenna. An RF feed is provided through one arm 14 of the antenna, as shown in FIG. 1. Each arm 14, 14' is separated by a non-metal tubing 18, which in an embodiment can be about 3 meters long. This non-metal tubing 18 maintains a predetermined distance between the aims 14, 14' while moving across a surface.

In an embodiment, the dual mode ground penetrating radar 10 does not use resistors. Instead, the resistive loading of the antenna is provided by ferrites that are implemented at intervals along the arms 14, 14' to obtain the desired broadband antenna frequency response. The use of ferrites is advantageous because they enable the antenna to be excited at its midpoint without the use of resistors. A sheathing of protective material is placed over the ferrites and the coaxial cable, for protection. The material can be, for example, a polyurethane or other plastic material.

The ferrite material is selected to have a low $\mu'$ and high $\mu''$ at the frequency of operation. This makes the ferrite behave more like a pure resistor than an inductor. In an embodiment, the frequency of interest $\mu''$ may be about at least 3 times larger than $\mu'$. This makes the ferrite look mainly resistive, not inductive. The actual value is less important as this can be compensated for by using more than one ferrite, e.g., two or three side by side to provide the wanted resistance.

Figure 2:
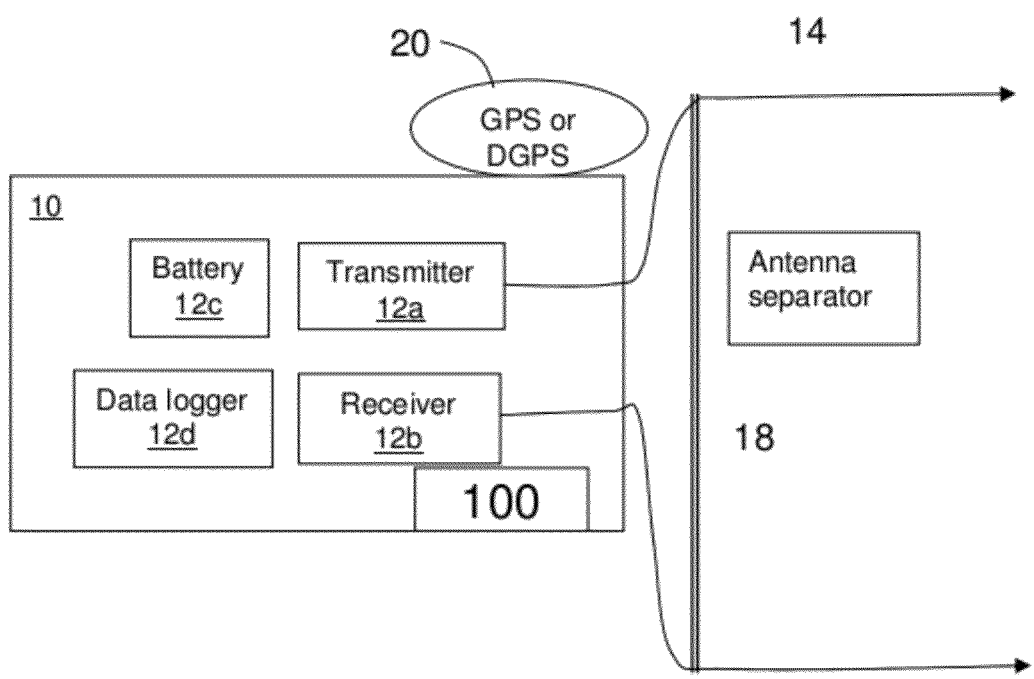
FIG. 2 shows a more detailed implementation of the dual mode ground penetrating radar in accordance with aspects of the invention.

FIG. 2 shows a dual mode GPR according to aspects of the present invention. The structure includes an enclosure (e.g., housing) 12 which includes electronics and a computer infrastructure 100. The computer infrastructure 100 can be placed internally or externally to the housing 12. The electronics include, for example, a transmitter 12a, a receiver 12b, and a datalogger 12d, connected to one another via wired or wireless communications. In an embodiment, a battery 12c can provide the power to the transmitter 12 a, receiver 12b, datalogger 12d and the computer infrastructure 100.

In an embodiment, the first arm 14 is connected to the transmitter 12a, and the second arm 14' is connected to the receiver 12b. The first arm 14 and the second arm 14' are separated by the antenna separator 18, which can be non-metal tubing 18. The arms 14, 14' may be coaxial cables with ferrite threaded over the coaxial cables.

In an embodiment, the transmitter 12a produces the RF pulses of energy that are radiated into the ground by the antenna. The transmitter 12a preferably has the ability to generate the required mean RF power and required peak power, has a high RF stability to meet signal processing requirements, and is easily modulated to meet waveform design requirements. In an embodiment, the transmitter can be, for example, a Power-Amplifier-Transmitters (PAT); although other transmitters are also contemplated by the present invention.

In an embodiment, the receiver 12b amplifies the received signals without adding noise or introducing any significant form of distortion. In an embodiment, the receiver 12b provides a large dynamic range to accommodate large clutter signals and is designed to reject interfering signals so that the required information can be optimally detected. The receiver 12b is designed for a certain sensitivity level based on requirements, to ensure that the receiver 12b does not process any extraneous process signals. More specifically, the receiver 12b has a high sensitivity using real time Analog to Digital conversion and a field-programmable gate array (FPGA) for signal processing.

In an embodiment, conventional GPR receivers have a sampling (strobe) receiver, which provides only one time sample for each transmit pulse. So to build up a trace of say, 256 points, 256 transmit pulses have to be used. In implementation, though, the real time Analog to Digital conversion can sample all 256 points on the single transmit pulse. Accordingly, as compared with the known systems, the remaining 255 transmit pulses can now be used to average (stack) the track 255 times which reduces the noise to 24 dB. This results in a higher sensitivity. This averaging is done in the FPGA in real time, before the data is sent to the datalogger 12d (or display). As discussed in further detail below, a pulse compression can also be used to increase sensitivity.

In an embodiment, the datalogger 12d is an electronic device that records data over time or in relation to location either with a built in instrument or sensor or via external instruments and sensors. In an embodiment, the datalogger 12d is battery powered, portable, and equipped with a microprocessor, internal memory for data storage, and sensors. These components can be implemented using the computing infrastructure 100. In further embodiment, the datalogger 12d interfaces with the computing infrastructure 100 to analyze the collected data. In a further embodiment, the datalogger 12d can include a local interface device (keypad, LCD) and can be used as a stand-alone device. The data logger 12d of the present invention is programmable; however, it can also be a state machine with only a limited number or no changeable parameters. The datalogger 12d can include chart recorders. The advantage of using the datalogger 12d of the present invention is that it allows for a comprehensive, accurate picture of the environmental conditions being monitored, such as air temperature and relative humidity.

The dual mode ground penetrating radar 10 further includes a GPS 20 which can be internal or external to the housing 12. The GPS 20 provides reliable location information in all weather and at all times and anywhere on the surface of the Earth. This allows for accurate mapping using the dual mode ground penetrating radar 10 of the present invention.

Figure 3:
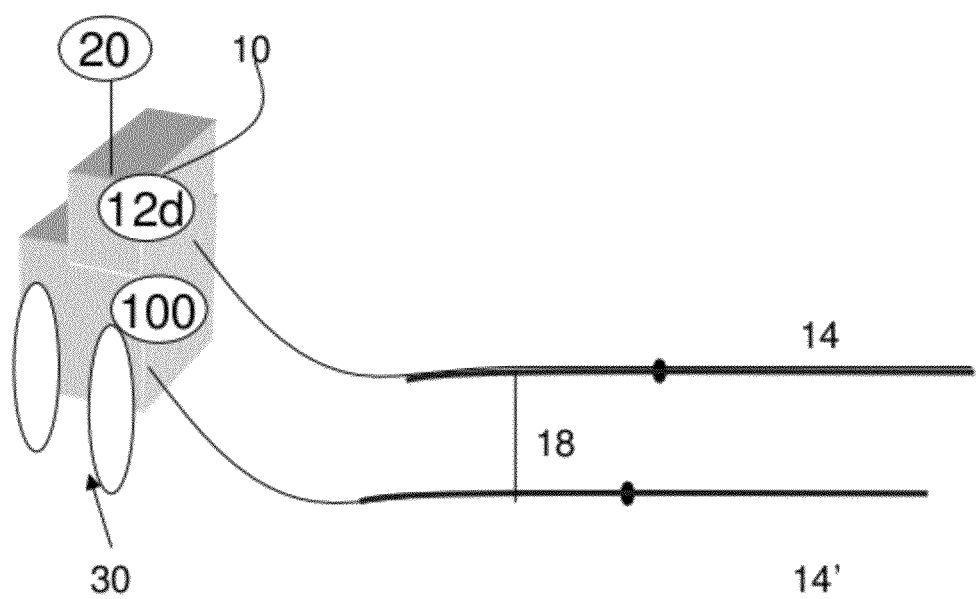
FIG. 3 shows the dual mode ground penetrating radar as implemented in a vehicle in accordance with aspects of the invention.

FIG. 3 shows the dual mode ground penetrating radar 10 as implemented in a vehicle 30. The vehicle 30 can be any type of motor vehicle such as a car, truck, or sports utility vehicle. The housing 12 is contained in the vehicle 30 and the first arm 14 and the second arm 14' are fed from the vehicle 30. Further, the first arm 14 and the second arm 14' are separated by an antenna separator 18. In an embodiment, the dual mode ground penetrating radar 10 may receive its power from the vehicle, instead of having an internal power source. Additionally, the GPS or (DGPS) 20 can be mounted to the vehicle 30. In an embodiment, the vehicle can house the datalogger 12d and the computer infrastructure 100.

Figure 4:
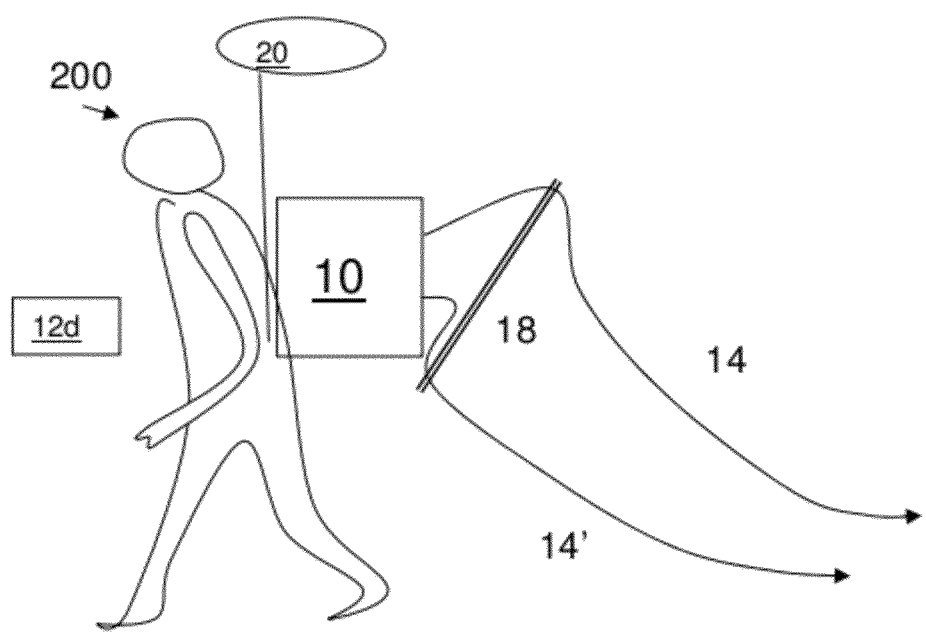
FIG. 4 shows the dual mode ground penetrating radar as implemented in a backpack in accordance with aspects of the invention.

According to aspects of the invention, the dual mode ground penetrating radar 10 can also be implemented in a backpack 40 for a person 200 to wear as shown in FIG. 4. In an embodiment, the backpack 40 contains the housing 12 for the electronics, which includes the transmitter 12a, the receiver 12b, and the battery 12c. The datalogger 12d is external to the backpack and can be held by the person 200. The GPS 20 can also be external to the backpack 40, but communicates with the components in the housing 12. The first arm 14 and the second arm 14' are fed from the backpack 40, which are separated by antenna separator 18.

Figure 5:
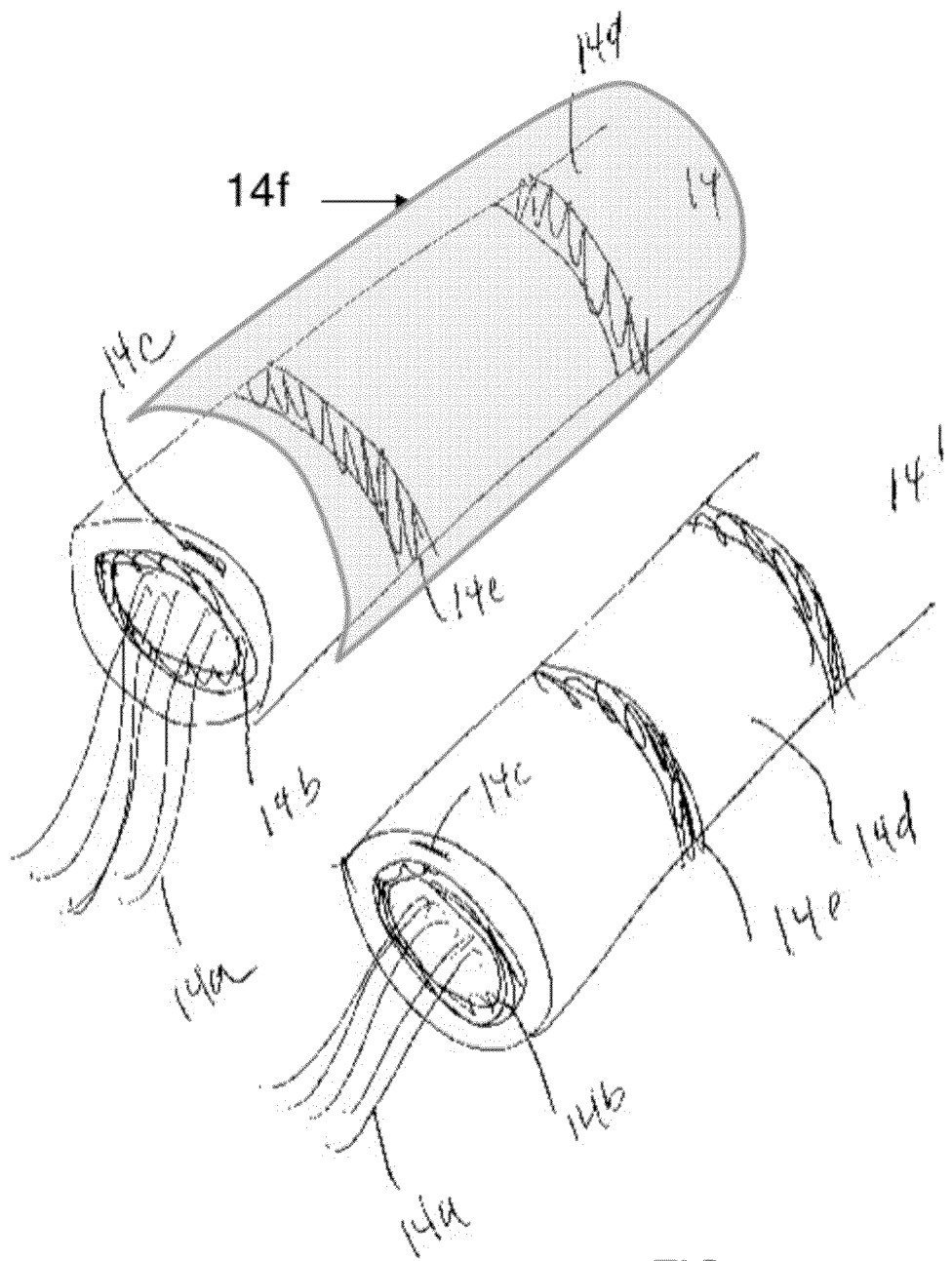
FIG. 5 shows a detailed view of the aims of the dual mode ground penetrating radar in accordance with aspects of the invention.

FIG. 5 shows a detailed view of the arms 14, 14' of the dual mode ground penetrating radar 10 in accordance with aspects of the present invention. As shown in FIG. 5, the arms 14, 14' are coaxial cables with ferrite rings, for example. More specifically, the first arm 14 and the second arm 14' include an inner cable 14a, an insulator 14, an outer cable 14c, and an outer shell 14d. Ferrites are threaded along the arms 14, 14' at predetermined intervals for resistive loading to obtain the desired broadband antenna frequency response. Appropriate ferrites are selected to obtain the desired broadband antenna frequency response (e.g., resistive loading) based on the desired frequency, loss required and power dissipation. An RF signal is provided along the inner cable 14a.

More specifically, the outer screen (of ferrite) is used as the antenna radiating element with the wanted common mode resistive loss. The coaxial inner wire 14a is independently used to carry the RF signal to the center of the antenna. To generate the equivalent of an open circuit at the end of the antenna, a multi-turn low loss inductive ferrite is used, which provides a high impedance at this point defining the end of the antenna. On the coaxial cable beyond this point, lossy ferrites are used at regular intervals up to the electronics hardware, to stop the cable radiating and creating resonances.

In an embodiment, three to five segments per antenna are contemplated by the present invention; although three segments is sufficient. In further embodiments, equal spacing between the ferrites is contemplated by the present invention. In further embodiments, the ferrite rings are toroids large enough in the center to thread over the outer of the coaxial antenna cable. The outer diameter, though, is sized so that an outer protective tube can be fitted over the whole antenna. The ferrite rings are also large enough to be able to dissipate the heat generated by the RF loss in the ferrite. A sheathing of protective material 14f is placed over the ferrites and the coaxial cable, for protection. The protective material can be, for example, a polyurethane or other plastic material, and is shown in FIG. 5 only partially covering the components (although it is understood that the protective material 14f may cover the entire antenna and/or the ferrites).

Figure 6:
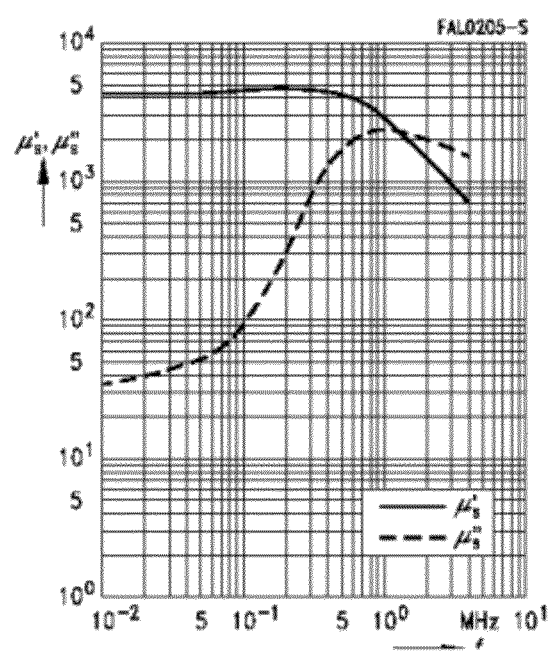
FIG. 6 shows characteristics of ferrite Epcos N30 used with the dual mode ground penetrating radar in accordance with aspects of the invention.

FIG. 6 shows the characteristics of an example ferrite, Epcos N30, used in aspects of the present invention. As shown in FIG. 6, above 1 MHz, the lossy (resistive) part of the permeability is greater than the real (inductive) part. Therefore, Epcos N30 acts as a resistor above 1 MHz. Therefore, by choosing appropriate ferrite material and size, different resistive equivalents can be generated. For example, a 10 mm diameter toroid of N30 is equivalent to a 22 ohm resistor from 5 to 15 MHz when threaded over a single wire. Further, in order to generate an open circuit equivalent at the end of the antenna, a multi-turn low loss inductive ferrite can be implemented with the present invention. This results in a high impedance at the end of the arms 14, 14' of the antenna. On the coaxial cable beyond this point, lossy ferrites are used at regular intervals up to the electronics hardware, to stop the arms 14, 14' from radiating and creating resonances.

Figure 7:
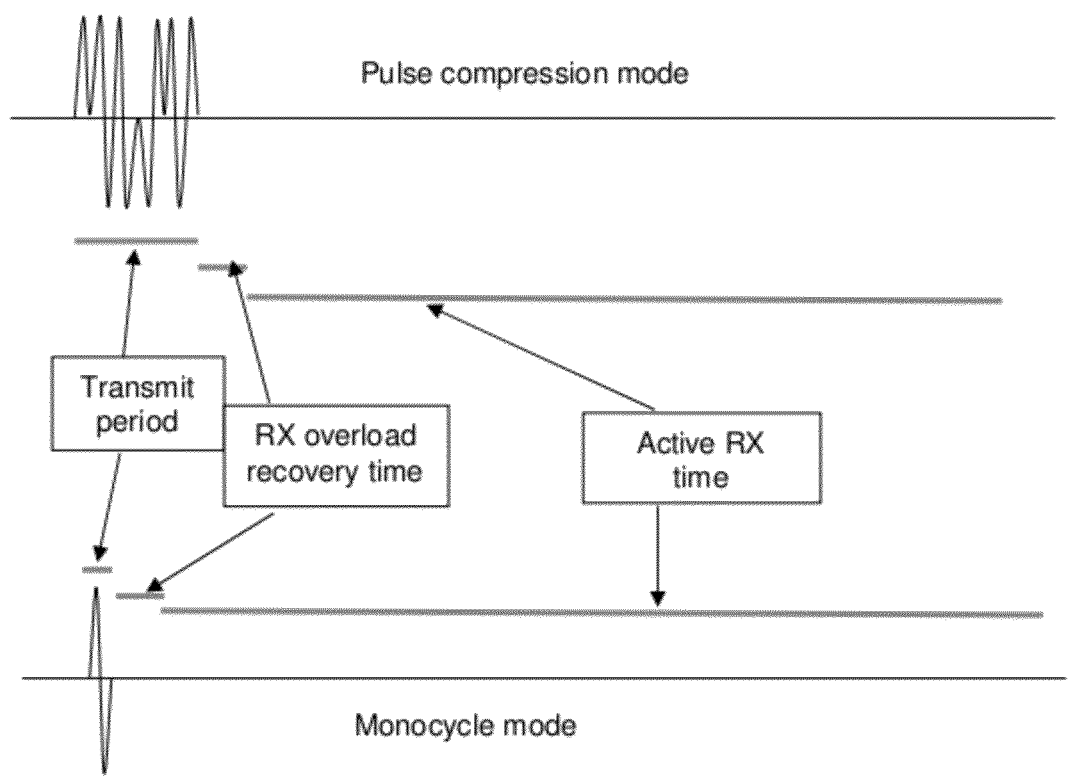
FIG. 7 shows how pulse compression is applied to a signal received by the antenna of the dual mode ground penetrating radar in accordance with aspects of the invention.

In order to achieve maximum depth performance, pulse compression is used in the dual mode ground penetrating radar 10. According to aspects of the present invention, pulse compression improves the receiver sensitivity. By way of an example, in pulse compression mode, a transmit pulse is spread out in time and compressed in the receiver to provide good time resolution. For example if the pulse is spread out 8 times, the mean power is 8 times larger than for a single short pulse. In turn, 8× more power provides a 9 dB improvement. However, during the length of the transmit pulse, the receiver is blinded and cannot receive any returns. By having a transmit mode with only a single short pulse interleaved, this blinding window is reduced, providing improved shallow range performance. In embodiments, the receiver (12b) is synchronized to the transmitter (12a) so the radar can detect when the long and short pulses are sent and change the internal processing accordingly. To reduce the depth of the minimum shallow depth, a short transmit pulse is interleaved in the transmit sequence as shown in FIG. 7. This short monocycle allows the dual mode ground penetrating radar 10 to be active in a shorter period of time after the transmit start time. This results in better shallow depth performance, as shown in FIG. 7.

According to aspects of the present invention, several pulse compression methods may be used, such as chirp, stepped frequency modulated continuous-wave (FMCW), and direct sequence phase modulation. For example, a type of phase modulation with a specific code sequence, such as Golay code, can also be implemented with the present invention. This particular combination requires transmitting two sequences to achieve in the benefit of full time side lobe suppression.

Figure 8:
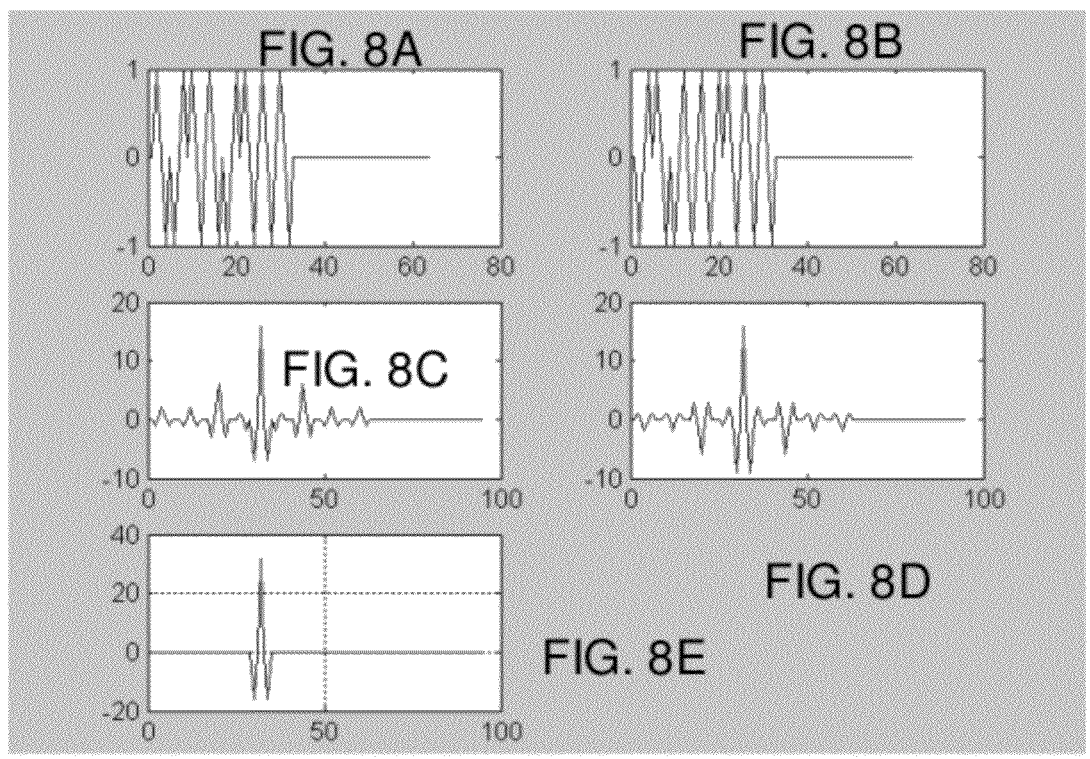
FIGS. 8A-8E show sequences combined in accordance with aspects of the invention.

As shown in FIGS. 8A-8B, there are two sequences, which are correlated between each other, resulting in a time response. After correlating the individual sequences with themselves, the resulting time responses are shown in FIGS. 8C and 8D. As the time side lobes have opposite signs, when added together a perfect correlation with zero side lobes is achieved as shown in FIG. 8E. This correlation is performed in real time using the FPGA in the receiver.

Figure 9:
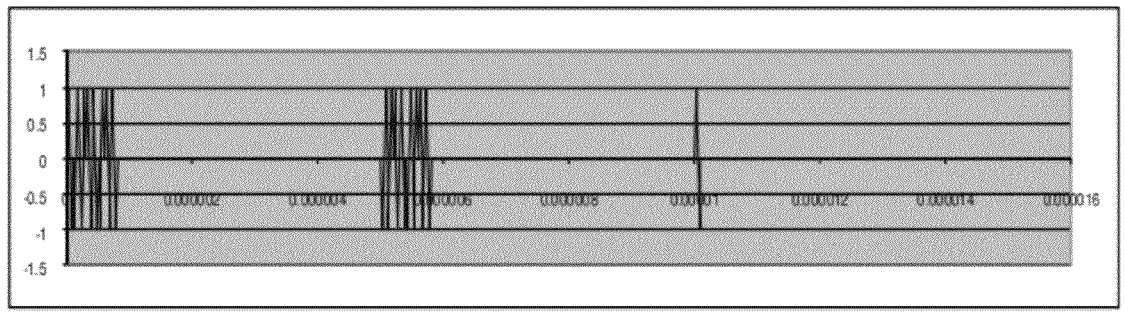
FIG. 9 shows a resulting signal after two sequences are combined in accordance with aspects of the invention.

FIG. 9 shows how an improved signal-to-noise ratio is obtained according to an aspect of the present invention. For example, to provide a better signal to noise ratio in the receiver, a large number of received pulses, e.g., about 30,000 pulses, are averaged (stacked), and a monocycle transmit pulse is interleaved after the Golay code pulses to give better shallow range resolution, as shown in FIG. 9. More specifically, as shown in FIG. 9, two long codes followed by a short transmit pulse are averaged in the receiver's FPGA, resulting in different compressed codes. The results are sent to the datalogger, for example, for storage and processing. As a result, there are two types of radars that are seamlessly integrated.

Figure 10:
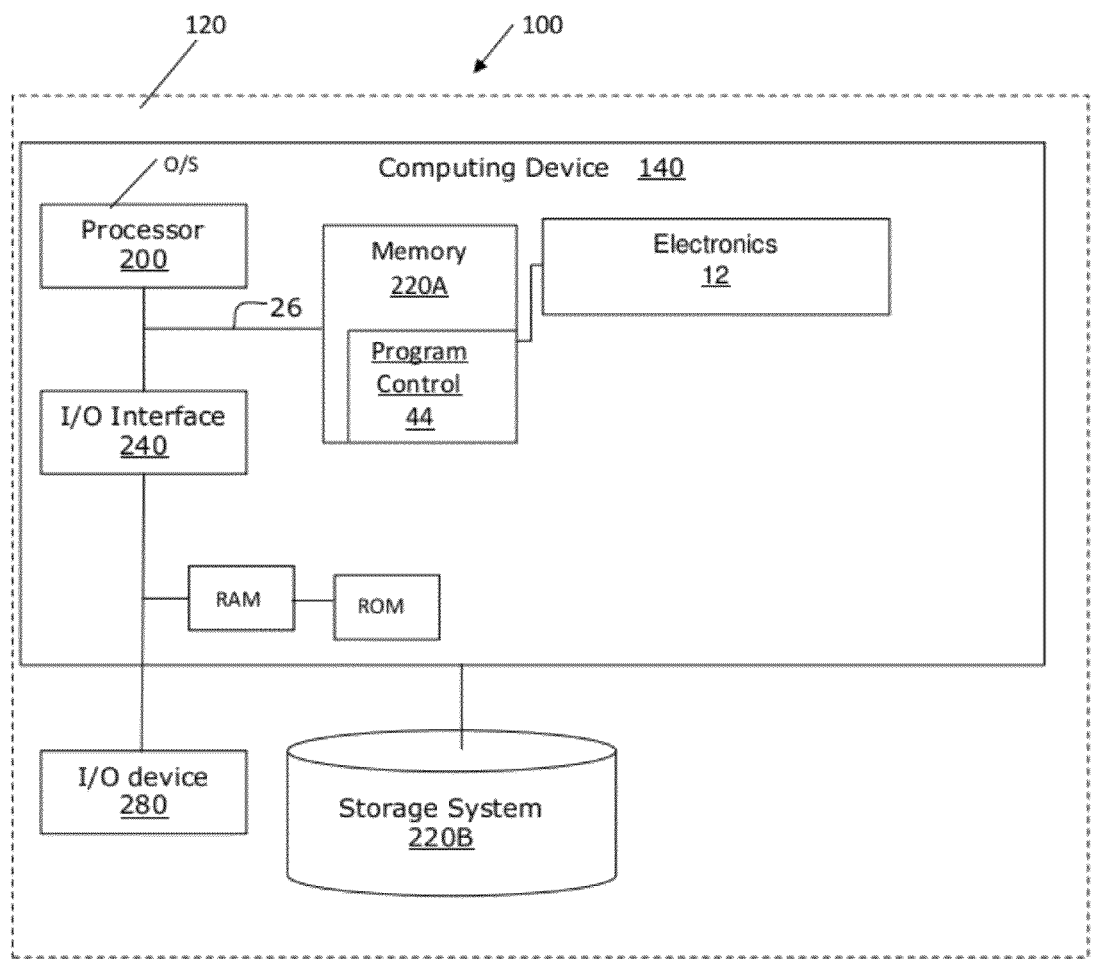
FIG. 10 shows a computer infrastructure used in implementing the dual mode ground penetrating radar in accordance with aspects of the invention.

FIG. 10 shows a computing infrastructure 100 for managing the processes in accordance with aspects of the invention. To this extent, the computing infrastructure 100 includes a computing system 120 that can perform the processes described herein. In particular, the computing system 120 includes a computing device 140. The computing device 140 includes a processor 200, memory 220A, an I/O interface 240, and a bus 260. The memory 220A includes local memory employed during the actual execution of program code, bulk storage, and cache memories which provide temporary storage of at least some program code in order to reduce the number of times code must be retrieved from bulk storage during execution. In addition, the computing device 140 includes random access memory (RAM), a read-only memory (ROM), and an operating system (O/S).

The computing device 140 is in communication with the external I/O device/resource 280 and the storage system 220B. The storage system 220B may be the datalogger, for example. The I/O device 280 can comprise any device that enables an individual to interact with the computing device 140 (e.g., user interface or datalogger 12a) or any device that enables the computing device 140 to communicate with one or more other computing devices using any type of communications link. The external I/O device/resource 280 may be for example, a handheld device, PDA, handset, keyboard etc. The computing infrastructure 120 can communicate over any type of communications link, such as a network, a shared memory, or the like, to perform the process described herein. The communications link comprises any combination of wired and/or wireless links; any combination of one or more types of networks (e.g., the Internet, a wide area network, a local area network, a virtual private network, etc.); and/or utilizes any combination of transmission techniques and protocols. In this way, the computing infrastructure 120 can be provided remotely from the dual mode ground penetrating radar 10.

In general, the processor 200 executes computer program code (e.g., program control 44), which can be stored in the memory 220A and/or storage system 220B. The program control 44 may be implemented as separate dedicated processor or a single or several processors to provide the function of these tools. While executing the computer program code, the processor 200 can read and/or write data to/from memory 220A, storage system 220B, and/or I/O interface 240. The program code executes the processes of the invention. The bus 260 provides a communications link between each of the components in the computing device 140.

The functionality provided by the computing device 140 can be implemented by a computing article of manufacture that includes any combination of general and/or specific purpose hardware and/or computer program code. In each embodiment, the program code and hardware is created using standard programming and engineering techniques, respectively.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A dual mode ground penetrating radar, comprising:
an enclosure housing radar electronics;
a first antenna feed having ferrite loading and extending outside of the enclosure; and
a second antenna feed spaced apart from the first antenna feed, the second antenna feed having ferrite loading and extending outside of the enclosure,
wherein an RF signal is provided in at least one of the first and second antenna feeds by the radar electronics, and
the ferrite is a multi-turn low loss inductive ferrite which provides a high impedance at a point defining an end of the antenna and, beyond the end, lossy ferrites at regular intervals up to the radar electronics.

2. The dual mode ground penetrating radar of claim 1, wherein a first antenna and a second antenna are center fed resistively loaded dipoles to achieve broadband, non-resonating radar performance.

3. The dual mode ground penetrating radar of claim 1, wherein the radar electronics include a transmitter and a receiver, and the first antenna feed and the second antenna feed extending outside the enclosure are respectively connected to the transmitter and the receiver.

4. The dual mode ground penetrating radar of claim 1, wherein the radar electronics provide a 5 to 20 MHz frequency band range.

5. The dual mode ground penetrating radar of claim 4, wherein the receiver includes a field-programmable gate array (FPGA) for signal processing and performs convolution and averaging for increased sensitivity.

6. The dual mode ground penetrating radar of claim 1, further comprising a datalogger provided internally or externally of the enclosure for recording data.

7. The dual mode ground penetrating radar of claim 1, wherein a first antenna and a second antenna are devoid of electronics and are fed by coaxial cables with ferrites provided at intervals along the first and second antenna feeds to obtain desired broadband antenna frequency response, wherein a coaxial inner wire is independently used to carry the RF signal to a center of the antenna.

8. A dual mode ground penetrating radar, comprising:
an enclosure housing radar electronics;
a first antenna feed having ferrite loading and extending outside of the enclosure; and
a second antenna feed spaced apart from the first antenna feed, the second antenna feed having ferrite loading and extending outside of the enclosure,
wherein an RF signal is provided in at least one of the first and second antenna feeds by the radar electronics,
a first antenna and a second antenna are devoid of electronics and are fed by coaxial cables with ferrites provided at intervals along the first and second antenna feeds to obtain desired broadband antenna frequency response,
a coaxial inner wire is independently used to carry the RF signal to a center of the antenna, and
ferrite material of the ferrites is selected to have a low $\mu'$ and high $\mu''$ at a frequency of operation to make the ferrite behave more like a pure resistor than an inductor.

9. The dual mode ground penetrating radar of claim 8, wherein $\mu''$ is about at least 3 times larger than $\mu'$.

10. The dual mode ground penetrating radar of claim 1, further comprising a Global Positioning System (GPS) or the Differential Global Positioning System (DGPS) to provide location information for accurate mapping.

11. The dual mode ground penetrating radar of claim 1, further comprising a battery for powering the radar electronics.

12. The dual mode ground penetrating radar of claim 1, wherein the radar electronics enclosure and an enclosure of a power supply is a vehicle or a portable back pack.

13. A dual mode ground penetrating radar, comprising:
an enclosure housing radar electronics;
a first antenna feed having ferrite loading and extending outside of the enclosure; and
a second antenna feed spaced apart from the first antenna feed, the second antenna feed having ferrite loading and extending outside of the enclosure,
wherein an RF signal is provided in at least one of the first and second antenna feeds by the radar electronics and an outer screen is formed from the ferrite which is an antenna radiating element with wanted common mode resistive loss, wherein:

the ferrite is threaded along the first antenna feed and the second antenna feed in equal spacing at predetermined intervals for resistive loading to obtain a desired broadband antenna frequency response;

a sheathing of protective material is placed over the ferrite;

the ferrite has a lossy resistive part of permeability greater than a real inductive part at 1 MHz such that the ferrite acts as a resistor above 1 MHz;

the ferrite is selected to have a low µ' and high µ" at a frequency of operation to make the ferrite behave more like a pure resistor than an inductor; and the ferrite is a multi-turn low loss inductive ferrite which provides a high impedance at a point defining an end of the antenna and, beyond the end, the lossy ferrites at regular intervals up to the radar electronics.

14. A dual mode ground penetrating radar, comprising:
an enclosure housing radar electronics;
a first antenna feed having ferrite loading and extending outside of the enclosure; and
a second antenna feed spaced apart from the first antenna feed, the second antenna feed having ferrite loading and extending outside of the enclosure,
  wherein an RF signal is provided in at least one of the first and second antenna feeds by the radar electronics and the ferrite is a 10 mm diameter toroid equivalent to a 22 ohm resistor from 5 to 15 MHz when threaded over a single wire.

15. The dual mode ground penetrating radar of claim 1, wherein a transmit pulse is spread out in time and compressed in the receiver and the receiver is synchronized to the transmitter so the receiver can determine when long and short pulses are sent to correlate internal processing, and the short transmit pulse is interleaved in the transmit sequence.

16. A dual mode ground penetrating radar, comprising:
an enclosure for housing electronics, the electronics comprising:
  a transmitter transmitting signals;
  a receiver for receiving signals, the receiver includes a real time analog-to-digital converter and a field-programmable gate array (FPGA) for signal processing and averaging for increased sensitivity;
an antenna comprising a first antenna feed and a second antenna feed connected to the transmitter and the receiver, respectively, the first antenna feed and the second antenna feed being shielded with ferrite and the second antenna feed having a wire independently used to carry a RF signal to a center of the antenna; and
a battery providing power to the electronics, wherein:
  the ferrite is selected to have a low µ' and high µ" at a frequency of operation to make the ferrite behave more like a pure resistor than an inductor; and
  the ferrite is a multi-turn low loss inductive ferrite which provides a high impedance at a point defining an end of the antenna and, beyond the end, lossy ferrites at regular intervals up to the radar electronics.

17. The dual mode ground penetrating radar of claim 16, wherein the battery is provided within the housing and the first antenna feed and the second antenna are separated by a non-metallic separator, and further comprising a datalogger for storing data received by the antenna.

18. The dual mode ground penetrating radar of claim 16, wherein the first antenna feed and the second antenna feed are provided in a side-by-side arrangement, separated by a non-metal separator.

19. The dual mode ground penetrating radar of claim 16, wherein the real time analog-to-digital converter is configured to sample all points on a single transmit pulse such that the FPGA can use remaining transmit pulses to average all tracks thereby reducing noise levels and the averaging is provided in real time prior to sending data to a datalogger.

20. The dual mode ground penetrating radar of claim 16, wherein:
the first antenna feed and the second antenna feed having ferrite loading; and
an outer screen formed from the ferrite is used as an antenna radiating element with wanted common mode resistive loss.

21. The dual mode ground penetrating radar of claim 1, wherein:
the ferrite is threaded along the first antenna feed and the second antenna feed in equal spacing at predetermined intervals for resistive loading to obtain a desired broadband antenna frequency response;
a sheathing of protective material is placed over the ferrite;
the ferrite has a lossy resistive part of permeability greater than a real inductive part at 1 MHz such that the ferrite acts as a resistor above 1 MHz;
the ferrite is selected to have a low µ' and high µ" at a frequency of operation to make the ferrite behave more like a pure resistor than an inductor.

22. The dual mode ground penetrating radar of claim 8, wherein:
the ferrite is threaded along the first antenna feed and the second antenna feed in equal spacing at predetermined intervals for resistive loading to obtain a desired broadband antenna frequency response;
the ferrite has a lossy resistive part of permeability greater than a real inductive part at 1 MHz such that the ferrite acts as a resistor above 1 MHz; and
the ferrite is a multi-turn low loss inductive ferrite which provides a high impedance at a point defining an end of the antenna and, beyond the end, lossy ferrites at regular intervals up to the radar electronics.

* * * * *